United States Patent
Gunning et al.

[19]

[11] Patent Number: 6,094,548
[45] Date of Patent: Jul. 25, 2000

[54] METHOD FOR DYNAMICALLY SYNCHRONIZING CONFIGURATION INFORMATION BETWEEN A PRINTER AND AN ATTACHED ACCESSORY

[75] Inventors: Chris R. Gunning, Boise; J. Sean Fresk, Eagle, both of Id.

[73] Assignee: Hewlett-Packard Company, Palo Alto, Calif.

[21] Appl. No.: 09/318,527

[22] Filed: May 25, 1999

[51] Int. Cl.[7] .......................... G03G 15/00; G03G 21/00
[52] U.S. Cl. .................... 399/75; 399/1; 399/81
[58] Field of Search .................. 399/1, 8, 9, 81, 399/75; 358/401

[56] References Cited

U.S. PATENT DOCUMENTS

| | | | |
|---|---|---|---|
| 5,600,445 | 2/1997 | Omi | 358/296 |
| 5,809,363 | 9/1998 | Kitamura et al. | 399/8 |
| 5,956,160 | 9/1999 | Watanabe | 358/496 |

*Primary Examiner*—Sandra Brase
*Assistant Examiner*—Greg Moldafsky

[57] ABSTRACT

A method for dynamically synchronizing configuration information between a printer and an attached accessory. In one embodiment, the printer firmware creates a configuration change object that is immediately incremented any time a configuration parameter is changed. The accessory periodically queries the printer to determine if the configuration change object has been incremented, and, if so, the accessory re-reads and stores the new printer configuration along with the new configuration change object. In a second embodiment, the printer sends out a notice to the accessory that the printer configuration has changed immediately after the change is made, rather than accessory periodically asking the printer if the configuration has changed.

7 Claims, 5 Drawing Sheets

METHOD FOR DYNAMICALLY SYNCHRONIZING CONFIGURATION INFORMATION BETWEEN A PRINTER AND AN ATTACHED ACCESSORY

FIELD OF THE INVENTION

The invention relates to a method for dynamically synchronizing configuration information between a printer and an attached accessory.

BACKGROUND OF THE INVENTION

The configuration of some printers can be changed during printer operations without power cycling the printer. The printer firmware may track such changes and automatically update configuration information on the printer's user interface, but these "run time" changes are not automatically known to accessories attached to the printer. It can be important for some accessories to know the present configuration of the printer, particularly for an accessory that also has a user interface that displays configuration information. The Hewlett-Packard Co. Mopier® 320, for example, integrates a scanner and a printer to function as a high speed printer and a high speed copier. Display manager firmware in a copy processor ("CP") manages the copier user interface. The CP operates as an accessory to the printer. The contents of several of the copier menus vary based on what paper is loaded in the paper trays and which optional devices (e.g., paper trays, output bins and stapling devices) are installed on the printer. For example, the user may change the paper in one of the paper trays from letter size to A4 size. Sensors in the paper tray make this change known immediately to the printer. It is desirable that this change also be known to any attached accessories and reflected immediately on the user interface for those accessories, including the copier display of the Mopier® 320 illustrated in FIGS. 3–5. In FIG. 4, the copier menu indicates that letter size paper is installed in Tray 2. When the letter size paper in Tray 2 is replaced with A4 size paper, the copier menu should be updated as shown in FIG. 5.

SUMMARY OF THE INVENTION

Accordingly, the present invention is directed to a method for dynamically synchronizing configuration information between a printer and an attached accessory. In one embodiment of the invention, the accessory periodically queries the printer to determine if the printer configuration has changed. In this embodiment, the method includes the steps of: the printer firmware creates a configuration change object and tracks the printer configuration parameters; upon initialization, the accessory reads and stores the printer configuration parameters and the configuration change object; during run time, the printer firmware increments or otherwise changes the configuration change object if any of the configuration parameters are changed; the accessory periodically queries the printer to determine if the configuration change object has been incremented; and, if the configuration change object has been incremented, the accessory re-reads and stores the new printer configuration along with the new configuration change object. User menus on the accessory can then be updated to reflect any change in the printer configuration.

In a second embodiment of the invention, the printer tells the attached accessory that the printer configuration has changed rather the accessory periodically asking the printer if the configuration has changed. The method of this second embodiment includes the steps of: the printer firmware tracks printer configuration parameters; the accessory reads and stores the printer configuration parameters; the printer notifies the accessory if and when a configuration parameter has changed; and the accessory re-reads and stores the new configuration parameters. As with the first embodiment, the user menus on the accessory can then be updated to reflect the changes to the printer configuration.

DESCRIPTION OF THE DRAWINGS

FIG. 4 shows letter size paper loaded in Tray 2. FIG. 5 shows A4 size paper loaded in Tray 2.

DETAILED DESCRIPTION OF THE INVENTION

Figure 1:
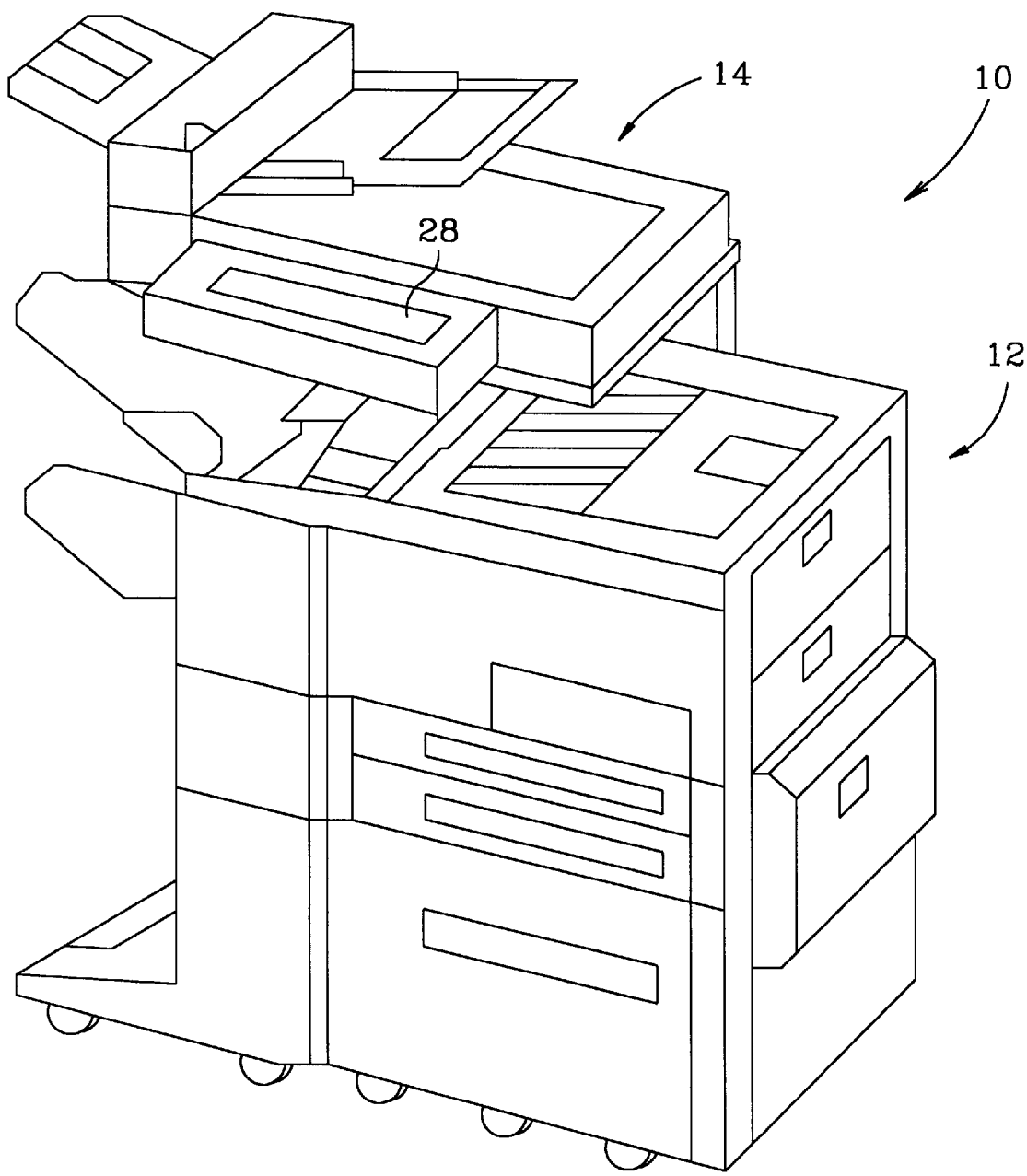
FIG. 1 is a perspective representation of a network copier, such as the Hewlett-Packard Co. Mopier® 320.

The preferred embodiment of the invention will be described with reference to a network copier, such as the Hewlett-Packard Co. Mopier® 320, which is designated by reference numeral 10 in the drawings. The Mopier® 320 integrates a scanner and a printer to function as a high speed printer and a high speed copier. Although it is expected that the invention will most often be used in "network copiers" as the Mopier® 320 and similar devices have come to be known, the invention is not limited to those types of devices. The invention may be embodied in any other similar types of printing systems that use a dynamically reconfigurable printer in which it is desirable to synchronize configuration data between the printer and an attached accessory.

Figure 2:
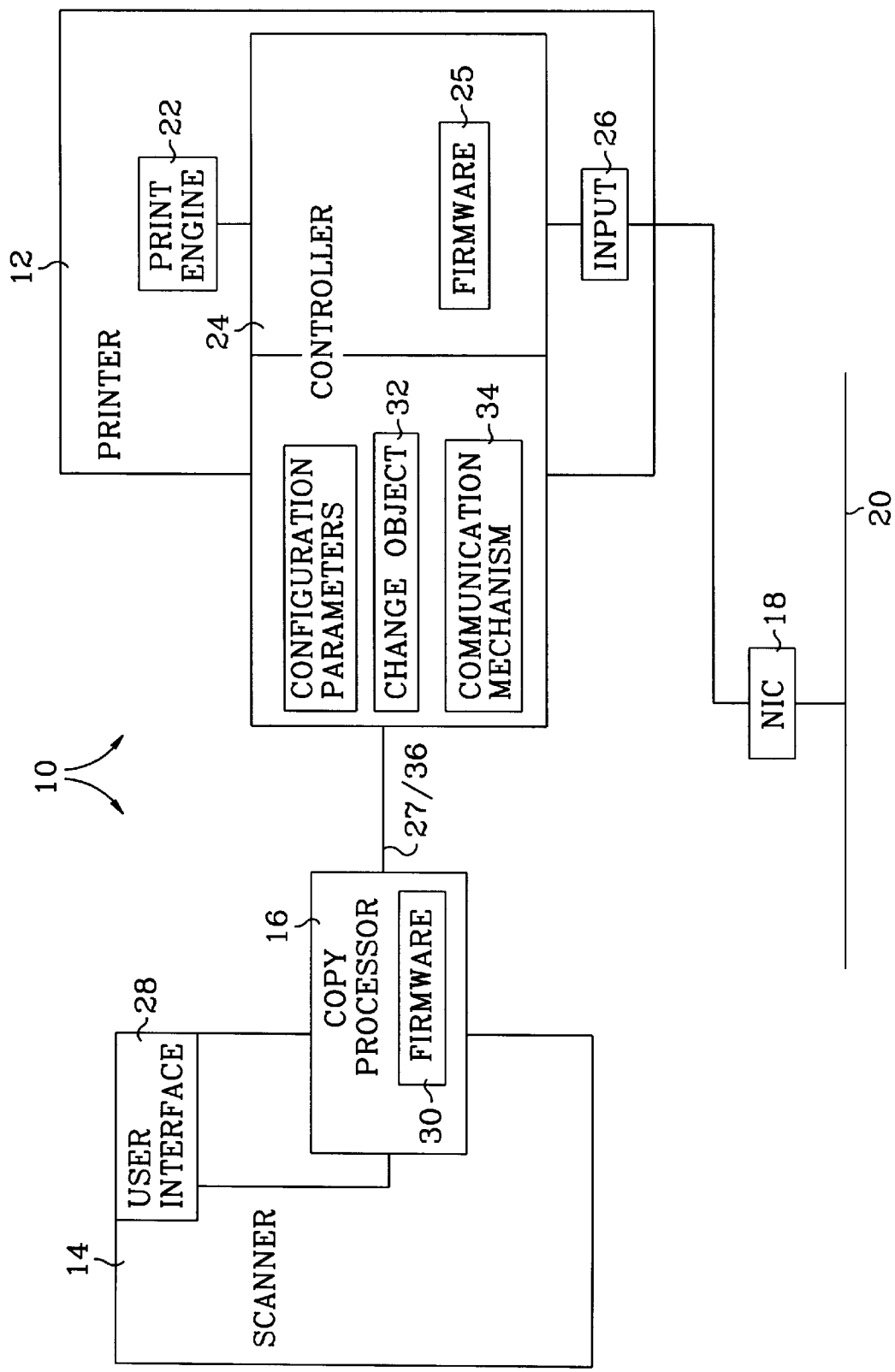
FIG. 2 is a block diagram of some of the basic components of the network copier of FIG. 1.

Referring now to FIGS. 1 and 2, network copier 10 includes a printer 12, a scanner 14, and a copy processor 16. Printer 12 is available to remote users/clients through a network interface card 18 and network 20. Printer 12 has a print engine 22 connected to a controller/formatter 24 which receives data to be printed from input 26. Input 26 represents generally, for example, a parallel input/output (PIO) port or channel, a serial input/output (SIO) port or channel, an enhanced input/output (EIO) port or channel and remote or wireless couples. Printer controller 22 also receives print data from scanner 14 through copy processor 16 and connector 27. Controller 22 typically includes a data storage device, associated electronics connecting controller 22 to print engine 22 and input 26, processing electronics, input buffers, and random access memory (RAM). The printer firmware 25 also resides in controller 22.

Figure 3:
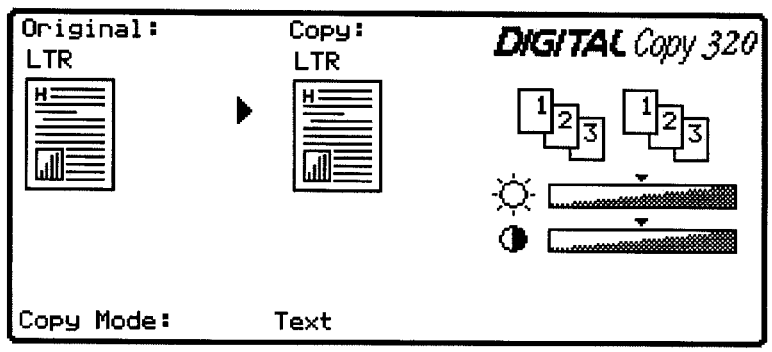
FIG. 3 shows the main menu displayed on the copier user interface of the network copier of FIG. 1.
Figure 4:
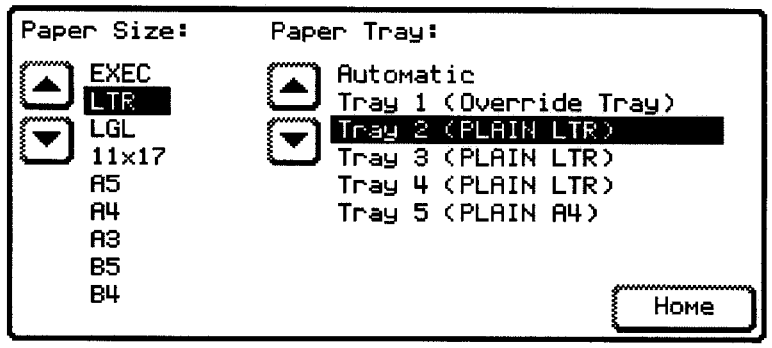
FIGS. 4 and 5 show the paper menu displayed on the copier user interface of the network copier of FIG. 1.
Figure 5:
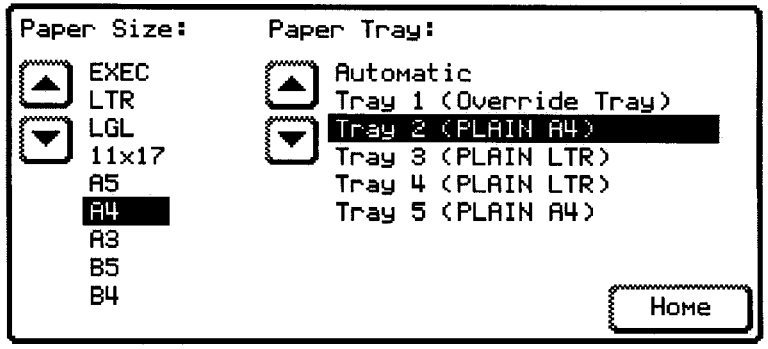

In the Mopier® 320, copy processor 16 is a modular circuit board installed in a slot in scanner 14. Copy processor 16 could also be integrated directly into the scanner hardware. Copy processor 16 is electronically attached to printer 12 through a serial bus or other suitable connector 27. Copy processor 16 communicates with and operates as an accessory to printer 12. Copy processor 16 performs image processing and manages the copier user interface 28. Display manager firmware 30 in copy processor 16 handles all aspects of copier user interface 28. The contents of some of the copier user interface menus vary based on what paper is loaded in printer 12 and which optional devices (e.g., paper trays, output bins and stapling devices) are installed on printer 12. FIG. 3 shows the main menu displayed on user interface 28. FIGS. 4 and 5 show the paper menu displayed on copier user interface 28. FIG. 4 reflects letter size paper loaded in Tray 2. FIG. 5 reflects A4 size paper loaded in Tray 2.

Figure 6:
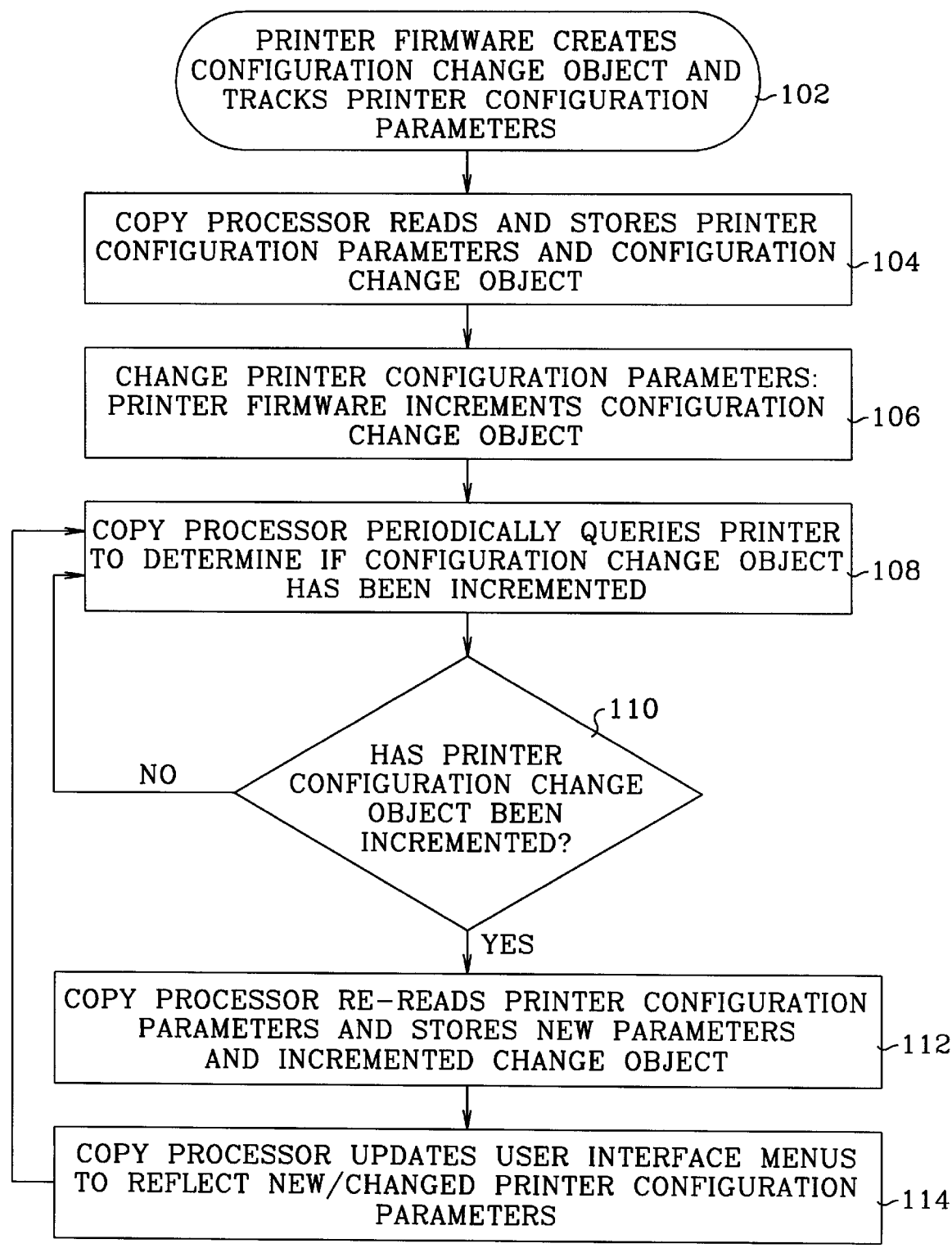
FIG. 6 is a flow chart illustrating one embodiment of the invention in which the copy processor queries the printer to determine if there has been any changes in the configuration of the printer.

Referring to FIGS. 2 and 6, printer firmware 25 tracks the configuration of printer 12 (step 102). If any of the printer configuration parameters change, copy processor 16 is immediately (or as soon as practicable) made aware of the change (steps 104–108). Preferably, this method is implemented with a single printer configuration change object 32 that is incremented or otherwise changed each time any printer configuration parameter is changed. This single change object 32 is used to signal a change in one or more printer configuration parameters. Whenever a configuration parameter changes, firmware 25 increments change object 32, which could simply be a counter, to signal a change has been made to the printer configuration (step 106). Network copier 10 includes a communications mechanism 34 that allows copy processor 16 to query printer 12 for configuration data during run time. Suitable communications mechanisms include Peripheral Management Language (PML), Simple Network Management Protocol (SNMP) or a special purpose protocol.

Copy processor 16 reads the configuration data for printer 12 and the configuration change object 30 when it initializes (step 104). Copy processor 16 will initialize whenever scanner 14 or printer 12 is turned on. Copy processor 16 stores the printer configuration data and the change object into a local cache or other suitable memory area. While the network copier is up and running, copy processor 16 queries printer 12 periodically to determine whether the configuration change object 32 has been changed (step 108). Copy processor 16 should query printer 12 as frequently as necessary so that the latency is not objectionable to the user. When copy processor 16 sees that object 32 has been changed, it invalidates its local configuration data cache, re-reads all of the printer configuration data and updates effected menus so that the user interface displays the current printer configuration (step 110–114). Menus updated to reflect a change in the paper size can be seen by comparing FIGS. 4 and 5. FIG. 4 shows letter size paper loaded in Tray 2. FIG. 5 shows a printer configuration change in which A4 size paper is loaded in Tray 2 in place of the original letter size paper.

Figure 7:
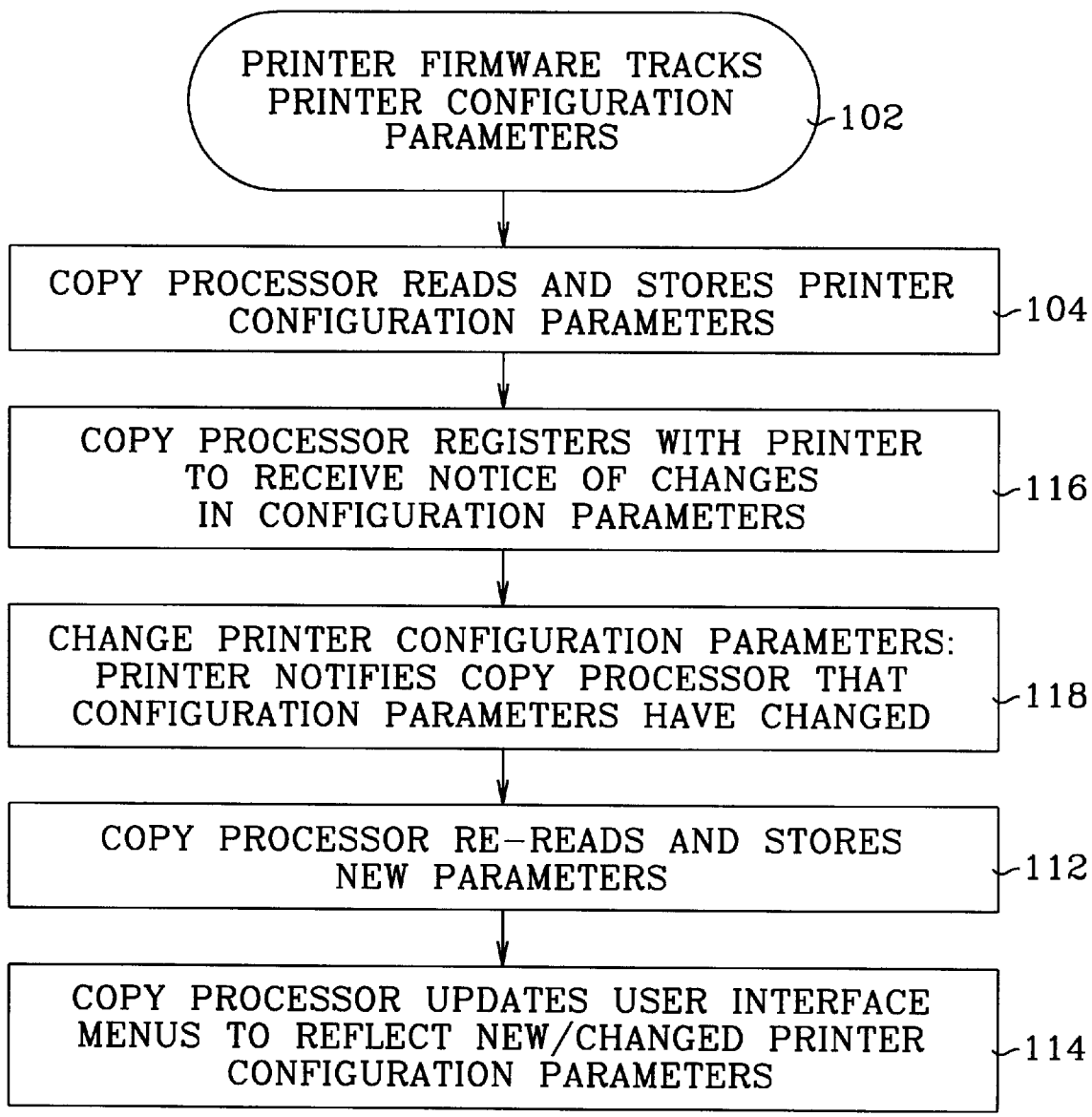
FIG. 7 is a flow chart illustrating a second embodiment of the invention in which the printer notifies the copy processor that there has been a change in the configuration of the printer.

In an alternative embodiment of the invention illustrated in FIG. 7, a notification mechanism is used to make copy processor 16 aware of a change in the printer configuration. The printer tells the accessory that the printer configuration has changed rather the copy processor periodically asking the printer if the configuration has changed. In this embodiment, copy processor 16 registers with printer 12 to receive notice of configuration changes (step 116) using, for example, PML in much the same way that a network device might register with the printer through a network communications channel using SNMP or some other network communications protocol. Printer 12 sends an asynchronous notification to copy processor 16 when the printer configuration changes (step 118). A PML trap—a method in which the printer notifies a client when a specific PML object changes—is one example of a suitable notification mechanism that may be used with an attached printer.

According to these two exemplary embodiments of the invention, run time changes in the printer configuration are dynamically updated and reflected on copy processor 16 user interface 28 without power cycling the accessory to read the new printer configuration and without any user interaction. In the first embodiment, the accessory periodically queries the printer to determine if the printer configuration has changed. In the second embodiment, the same result may be achieved using a PML trap instead of accessory polling, if the communication channel 36 between the printer and the accessory supports PML traps. If a PML trap is used, the printer sends out a notice to all attached accessories registered to receive notices that the printer configuration has changed. Upon receipt of the notice, the accessory re-reads all of the printer configuration parameters to obtain the current printer configuration.

While the present invention has been shown and described with reference to the foregoing exemplary embodiments, it is to be understood that other forms and details may be made thereto without departing from the spirit and scope of the invention which is defined in the following claims.

What is claimed is:

1. A method for synchronizing configuration information between a printer and an attached accessory, the method comprising:

printer firmware creating a configuration change object;

the printer firmware tracking printer configuration parameters;

the attached accessory reading and storing the printer configuration parameters and the configuration change object;

changing at least one of the printer configuration parameters;

the printer firmware changing the configuration change object;

the attached accessory periodically querying the printer to determine if the configuration change object has changed; and if the configuration change object has changed, the attached accessory re-reading and storing the at least one printer configuration parameter that has changed and the configuration change object.

2. The method of claim 1, further comprising the attached accessory updating at least one user menu to reflect the at least one printer configuration parameter that has changed.

3. The method of claim 2, further comprising the attached accessory having firmware operatively coupled to the printer firmware and the accessory firmware managing the at least one user menu.

4. A method for synchronizing configuration information between a printer and an attached accessory, the method comprising:

printer firmware tracking printer configuration parameters;

the attached accessory reading and storing the printer configuration parameters;

changing at least one of the printer configuration parameters;

the printer notifying the attached accessory that one of the configuration parameters has changed; and the attached accessory re-reading and storing the at least one printer configuration parameter that has changed.

5. The method of claim 4, further comprising the attached accessory updating at least one user menu to reflect the at least one printer configuration parameter that has changed.

6. The method of claim 5, further comprising the attached accessory having firmware operatively coupled to the printer firmware and the accessory firmware managing the at least one user menu.

7. A method for dynamically updating a user menu on an accessory attached to a printer, the method comprising:

the accessory reading a printer configuration and a configuration change object;

the accessory displaying at least a part of the printer configuration on the user menu;

changing the printer configuration and the configuration change object;

the accessory querying the printer for any change to the configuration change object; and if the configuration change object has changed, the accessory re-reading the printer configuration and displaying at least a part of the printer configuration that has changed on the user menu.

* * * * *